Jan. 3, 1967 F. J. COOPER 3,295,779

RECORD MEDIA HANDLING DEVICE

Filed Jan. 18, 1965 2 Sheets-Sheet 1

INVENTOR
FREDERICK J. COOPER

BY Louis A. Kline
Albert L. Sessler, Jr.

HIS ATTORNEYS

Jan. 3, 1967 F. J. COOPER 3,295,779

RECORD MEDIA HANDLING DEVICE

Filed Jan. 18, 1965 2 Sheets-Sheet 2

INVENTOR
FREDERICK J. COOPER
BY Louis A Kline
Albert L. Sessler, Jr.
HIS ATTORNEYS United States Patent Office 3,295,779
Patented Jan. 3, 1967

3,295,779

RECORD MEDIA HANDLING DEVICE

Frederick J. Cooper, Dayton, Ohio, assignor to The National Cash Register Company, Dayton, Ohio, a corporation of Maryland Filed Jan. 18, 1965, Ser. No. 426,159
7 Claims. (Cl. 242—55.12)

This invention relates generally to record media handling devices, and in particular relates to tensioning means for such devices.

The use of elongated record media, such as perforated tape or magnetic tape, as a medium for storage of information is well known. Generally, this information is read from the tape by a suitable sensing station past which the tape is moved by appropriate driving means.

In tape handling devices used in data processing systems and similar applications, the record media, or tape, is usually stored on reels, and when information is to be read from said tape, or recorded thereon, the tape is usually transferred from one reel, past the sensing and/or recording station, to another reel. In certain operations, the tape may be shifted from one reel to the other and back several times in the course of performing the necessary sensing and/or recording of information. The movement of the tape is often of an intermittent nature, with frequent starts and stops, under the control of the associated data processing system.

A common problem in the operation of tape handling devices resides in the looseness of winding of tape on a take-up reel which receives the tape after it has been processed. Many times during long operations in which there is no stopping or rewinding, the tape fails to wind tightly on the takeup reel. Upon subsequent attempts to process this reel of tape, the loosely wound tape is initially drawn from the reel by the driving means of the tape handling device without causing the reel to commence rotating. Then when the slack is exhausted and the tape is moving at its maximum rate, a taut condition of the tape is suddenly reached. This frequently causes the tape to be broken due to the inertia of the reel, which in turn causes a major interruption and an accompanying cost in man hours as well as "machine time" while the system is halted and the condition repaired.

A solution to this problem is effected by the present invention in the form of tensioning means which provide a drag on the tape to cause it to be wound more tightly on the reels, while at the same time offering no obstruction to movement of tape in the opposite direction, in which it is unwound from the reels. It is important that the tape be permitted to move freely in the direction in which the drag is not required, because the dragging effect builds up a static electrical charge on the tape, which may cause the tape to behave erratically as it moves past the reading and/or recording station.

In the present invention, a unidirectional rotating element placed between the tape reel and the driving means in the path of tape travel is used to achieve a drag on the tape when said tape is travelling in one direction, while permitting free movement of the tape in the opposite direction. In a well-known arrangement of tape handling device, utilizing two reels, each of which may serve both a takeup and a supply function, and a sensing and/or recording station, together with driving means positioned between the reels in the path of tape travel, two such unidirectional rotating elements are provided, one between each reel and the driving means.

It is accordingly an object of the present invention to provide novel tape tensioning means for a tape handling device.

Another object is to provide unidirectional rotatable tensioning means to insure proper feeding of tape onto a takeup reel of a tape handling device.

A further object is to provide means capable of tensioning tape as it is wound onto a reel, while permitting the tape to move freely as it is unwound from the reel.

An additional object is to provide, in a tape handling device including driving means, sensing and/or recording means, and two tape reels, two tensioning means, each positioned in the path of tape movement between the driving means and one of the tape reels, and capable of causing a drag upon the tape as it is unwound on either of the reels, while permitting free movement of the tape as it is unwound from either of the reels.

With these and incidental objects in view, the invention includes certain novel features of construction and combinations of parts, a preferred form or embodiment of which is hereinafter described with reference to the drawings which accompany and form a part of this specification.

Figure 1:
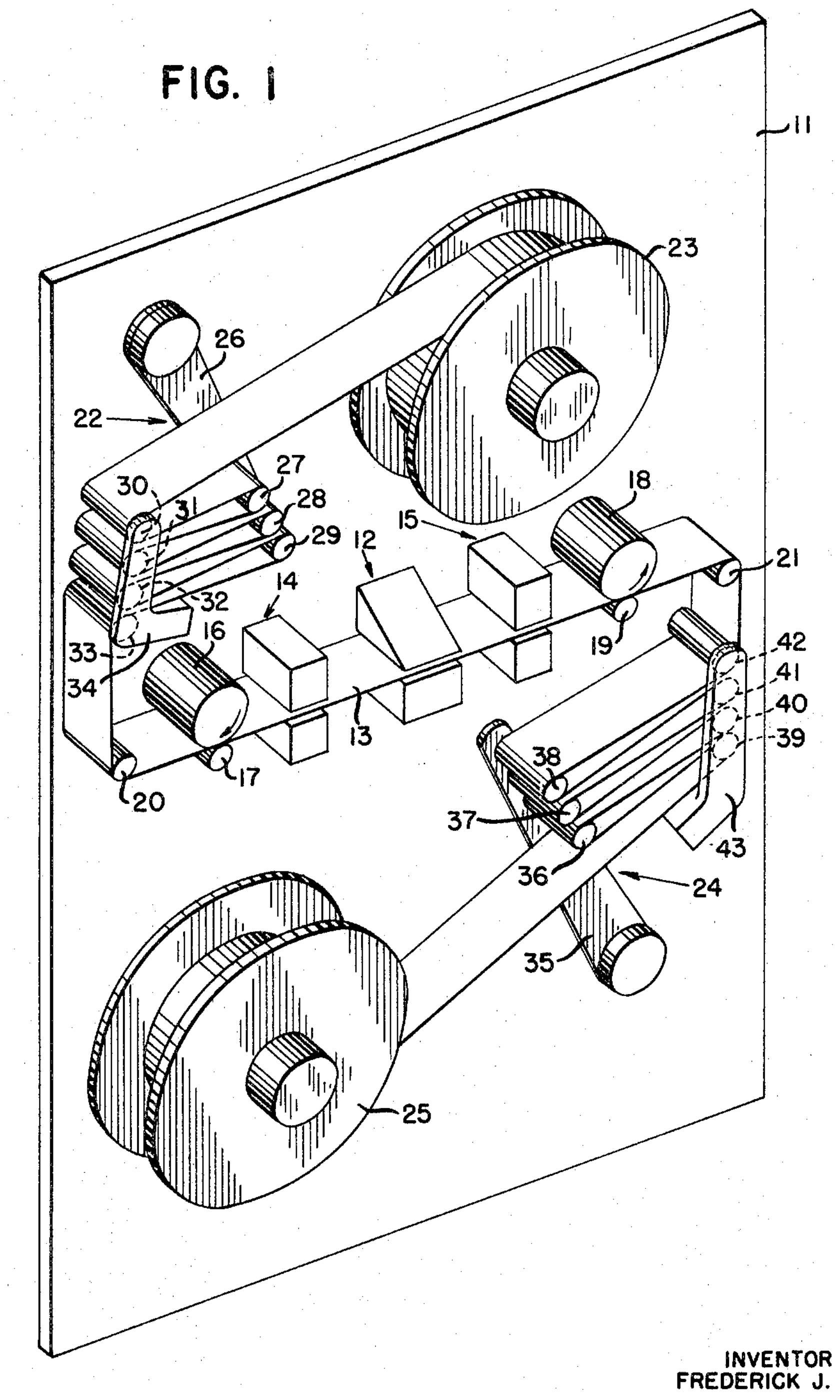
FIG. 1 is a perspective view of a tape handling device embodying the present invention.

Referring now to the drawings, the tape handling device shown in FIG. 1 includes a supporting plate 11, on which the various components of the device are mounted.

Centrally disposed on the supporting plate 11 is a sensing and/or recording means which takes the form, in the illustrated embodiment, of a sensing station 12, including upper and lower elements between which a tape 13 or other record medium passes. No specific structure is shown for the sensing station, since many suitable types of sensing stations are well-known in the art.

Located on either side of the sensing station 12 are two brakes 14 and 15, each having two cooperating elements between which the tape 13 is squeezed to halt its movement. If desired, the brakes 14 and 15 may be solenoid-operated, in a well-known manner.

Adjacent to the brake 14 is a tape driving means of any suitable type, which may include a motor-driven constantly-rotating capstan 16 and a cooperating solenoid-operated pinch roll 17, between which the tape 13 passes, to be driven to the left, as viewed in FIG. 1, whenever the pinch roll 17 is operated to press the tape 13 against the capstan 16. A similar capstan 18 and cooperating pinch roll 19 are located adjacent to the brake 15 for driving the tape 13 to the right, as viewed in FIG. 1.

That portion of the tape handling device which includes the sensing station, the braking means, and the driving means may conveniently be designated as the sensing area.

Two idler rollers 20 and 21, located to the outside of the two driving means, guide the tape 13 into and out of the sensing area.

From the roller 20, the path of movement of the tape 13 extends through a tape control means, designated generally by the reference character 22, and which will subsequently be described in greater detail, to a tape reel 23, on which the tape may be wound when said tape reel is serving in a take-up function, and from which the tape may be unwound when said reel is serving in a supply function. The reel 23 is fixed to a shaft (not shown) which extends through the plate 11 and which is driven by a motor through a non-slip timing belt in either of two directions of rotation.

In a similar manner, the path of movement of the tape 13 extends from the roller 21 through a second tape control means, designated generally by the reference character 24, to a second tape reel 25, on which the tape may be wound when the reel 25 is serving in a take-up function, and from which the tape may be unwound when said reel 25 is serving in a supply function. The reel 25, like the reel 23, is fixed to a shaft (not shown) extending through the plate 11, and is driven by a motor in either of two directions of rotation.

The tape control means 22 functions to provide a plurality of loops of tape between the sensing area of the tape handling means and the reel 23. These loops give an extra length of tape for flexibility of operation to compensate for any sudden changes in speed of the tape, such as may occur in starting and stopping, to prevent tearing of the tape or improper feeding past the sensing station which might otherwise take place. Included in the tape handling means is a control arm 26, on which are mounted three freely rotating rollers 27, 28, and 29. The arm 26 is fixed to a shaft (not shown) which extends through an opening in the plate 11. The arm 26 is urged to a limited extent in a counterclockwise direction as viewed in FIG. 1. Movement of the arm 26 is effective, through a potentiometer and associated circuitry (not shown) to vary the speed of the motor driving the tape reel 23, and thus vary the rate at which the tape 13 is taken up or supplied by the reel to assist in the maintenance of the proper tape tension.

Cooperating with the rollers 27, 28, and 29 to maintain the tape 13 in a plural loop configuration are a plurality of rollers 30, 31, 32, and 33 mounted on a bracket 34, which in turn is secured to the plate 11.

All of the rollers 30, 32, and 33 except the roller 31 are freely rotating in either direction, while the roller 31 is a unidirectional roller which will turn only in a counterclockwise direction, for a purpose to be subsequently described in detail.

The tape control means 24 is identical to the tape control means 22 in structure and operation, and includes a control arm 35 having freely rotating rollers 36, 37, and 38 thereon. Cooperating with these rollers to maintain the tape 13 in a plural loop configuration are the rollers 39, 40, 41, and 42. All of these rollers except the roller 40 are freely rotating in either direction, while the roller 40 will turn only in a counterclockwise direction. The rollers 39, 40, 41, and 42 are mounted on a bracket 43, which, in turn, is fixed to the plate 11.

Figure 2:
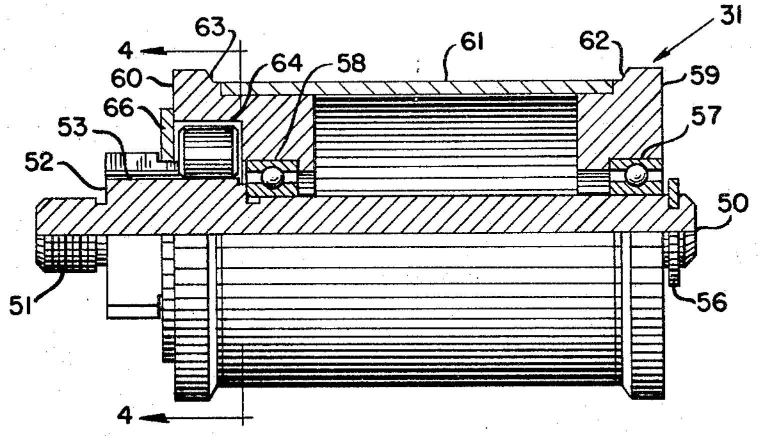
FIG. 2 is an elevational view, partially in section, of the unidirectional rotating element which forms a part of the present invention.
Figure 3:
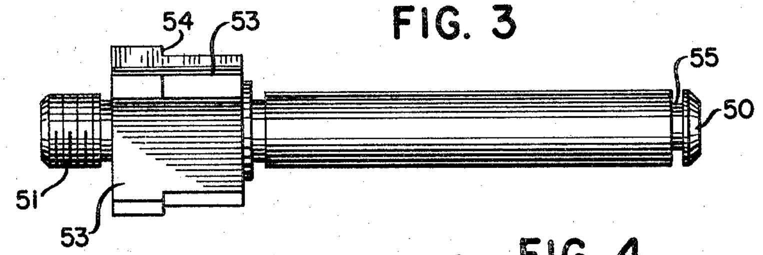
FIG. 3 is a detail view of the central axial member of the unidirectional rotating element of FIG. 2.
Figure 4:
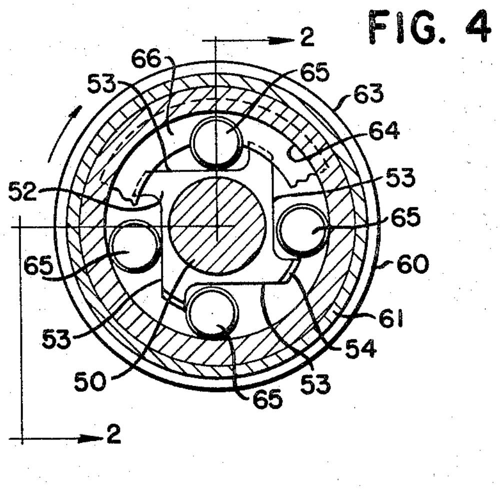
FIG. 4 is an end view of the unidirectional rotating element of FIG. 2.

The structure of the unidirectional roller 31 (which is identical to the structure of the roller 40) is shown in FIGS. 2, 3, and 4. An axial member 50 is provided with threads 51 at one end for mounting of the roller on the bracket 34. Adjacent to the threaded end is an enlarged portion 52 having a plurality of flat surfaces 53 (four, in the present embodiment) formed thereon. In addition, a step 54 is provided in the enlarged portion 52 for retaining an end plate 66 of the roller 31 in position, as will subsequently be described. The axial member 50 has a groove 55 at its other end, in which a clip 56 may be located to retain the roller on the member 50.

A pair of bearings 57 and 58 are provided between the axial member 50 and two end members 59 and 60, which are secured to a cylindrical member 61, on which the tape 13 rides. If desired, the end members 59 and 60 and the cylindrical member 61 could be made in one piece. A three-piece construction is illustrated here, since it provides a simple means of reducing the weight of the roller 31. Flanges 62 and 63 on the end members 59 and 60 prevent the tape from slipping off of the roller 31. A cylindrical cutout having an inner wall 64 is formed in the end member 60, and cooperates with the flat surfaces 53 on the enlarged portion 52 of the axial member 50 to define a plurality of recesses, in each of which is placed a cylindrical roll 65. The end plate 66 retains the rolls 65 in position in the recesses, and is itself retained in place by the step 54 on the enlarged portion 52 of the axial member 50.

Examination of FIG. 4 will reveal that each recess defined by the surface 53 and the wall 64 is of a configuration in which the effective distance between the surface and the wall varies from one end of the recess to the other. The roll 65 is of a slightly smaller diameter than the maximum effective distance between the surface and the wall measured perpendicular to the flat surface, but of a larger diameter than the minimum effective distance.

Accordingly, it will be apparent that the roller 31 is free to rotate on the axial member 50 in a clockwise direction as viewed in FIG. 4, since rotation of the end member 60 causes the rolls 65 to be shifted to, and remain in, the portion of the recess having the greatest effective height. On the other hand, an attempt to rotate the roller 31 in the counterclockwise direction as viewed in FIG. 4 results in at least some of the rolls 65 being located in the portion of the recess having a lesser effective height. This produces a camming action between the rolls 65, the surfaces 53, and the wall 64, which prevents counterclockwise rotation of the roller 31.

It will be seen that the position of at least two of the rolls 65 is determined by gravity, when the roller 31 is at rest. However, the structure of the roller 31, as shown in FIGS. 2, 3, and 4, by the incorporation of four rolls 65 and cooperating recesses, insures proper operation regardless of the rotational position of the roller.

Returning now to FIG. 1, the rollers 31 and 40 have been described as unidirectional rollers, while the remainder of the rollers are free turning in either direction. However, any of the other rollers in the tape control means 22 and 24 could be unidirectional instead of the rollers 31 and 40, if desired. Also, more than one roller in each of the tape control means could be of a unidirectional construction if desired.

It will be seen that if the tape 13 is fed from the reel 23 through the tape control means 22, the sensing area, and the tape control means 24 to the reel 25, then the roller 31 is free turning in a counterclockwise direction, so that no static electrical charge is built up on the tape 13, which might interfere with its running properly through the sensing area. On the other hand, the lower unidirectional roller 40 is prevented from rotating and exerts a drag on the tape 13 as it is wound onto the reel 25, thus insuring that the winding is in tight coils, so that the tape will be fed properly from the reel 25 in a subsequent operation.

Similarly, if the tape 13 is fed from the reel 25 through the tape control means 24, the sensing area, and the tape control means 22 to the reel 23, then the roller 40 is free turning in a counterclockwise direction, so that no static electrical charge is built up on the tape to interfere with proper sensing. With this direction of tape movement, the roller 31 is prevented from rotating and exerts a drag on the tape 13 as it is wound onto the reel 23, to insure proper winding.

While the form of the invention shown and described herein is admirably adapted to fulfill the objects primarily stated, it is to be understood that it is not intended to confine the invention to one form or embodiment disclosed herein, for it is susceptible of embodiment in various other forms.

What is claimed is:

1. In a record media handling device, the combination comprising driving means capable of driving record media in either one of two opposite directions;

braking means for halting movement of the record media;

sensing means for sensing information from the record media;

first driven reel means for taking up the record media when it is being driven by the driving means past the sensing means in a first of said directions, and for supplying the record media when said record media is being driven in a second of said directions by the driving means;

first tension control means positioned in the path of movement of the record media between the first reel means and the driving means for controlling tension of the record media;

second driven reel means for taking up the record media when it is being driven by the driving means past the sensing means in the second of said directions, and for supplying the record media when said record media is being driven in the first of said directions by the driving means;

second tension control means positioned in the path of movement of the record media between the second reel means and the driving means for controlling tension of the record media;

first unidirectional means positioned in the path of movement of the record media between the first reel means and the driving means, engaging said record media, adapted to rotate freely when the record media is being driven from the first reel means to the second reel means in the second of said directions by the driving means, and adapted to remain stationary when the record media is being driven from the second reel means to the first reel means in the first of said directions by the driving means, thereby imposing a frictional force on the record media to slow its movement when driven in said first direction; and second unidirectional means positioned in the path of movement of the record media between the driving means and the second reel means, engaging said record media, adapted to rotate freely when the record media is being driven from the second reel means to the first reel means in the first of said directions by the driving means, and adapted to remain stationary when the record media is being driven from the first reel means to the second reel means in the second of said directions by the driving means, thereby imposing a frictional force on the record media to slow its movement when driven in said second direction.

2. The device of claim 1, in which the unidirectional means each include a fixed axial member having a plurality of cutout surfaces thereon;

an annular member, having an outer surface which the record media engages, said member bearing on the fixed axial member and having an inner surface cooperating with the cutout surfaces of the axial member; and a plurality of coupling members, each located in a recess defined by one of the cutout surfaces and the cooperating inner surface of the annular member, said coupling members riding freely in said recesses when the annular member is rotated in one direction with respect to the axial member, and being moved into a camming engagement between the cutout surface of the axial member and the inner surface of the annular member when rotation of the annular member in the opposite direction with respect to the axial member is commenced, to prevent rotation of the annular member with respect to the axial member in said opposite direction.

3. The device of claim 2, in which the coupling members are cylindrical rollers.

4. In a record media handling device, the combination comprising driving means capable of driving record media in either one of two opposite directions;

first reel means for taking up the record media when it is driven by the driving means in a first of said directions, and for supplying the record media when said record media is being driven in a second of said directions by the driving means;

second reel means for taking up the record media when it is driven by the driving means in a second of said directions, and for supplying the record media when said record media is being driven in the first one of said directions by the driving means;

first unidirectional means positioned in the path of movement of the record media between the first reel means and the driving means, engaging said record media, adapted to rotate freely when the record media is being driven from the first reel means to the second reel means in the second of said directions by the driving means, and adapted to remain stationary when the record media is being driven from the second reel means to the first reel means in the first of said directions by the driving means, thereby imposing a frictional force on the record media to slow its movement when driven in said first direction; and second unidirectional means positioned in the path of movement of the record media between the driving means and the second reel means, engaging said record media, adapted to rotate freely when the record media is driven from the second reel means to the first reel means in the first of said directions by the driving means, and adapted to remain stationary when the record media is being driven from the first reel means to the second reel means in the second of said directions by the driving means, thereby imposing a frictional force on the record media to slow its movement when driven in said second direction.

5. The device of claim 4 in which the first and second unidirectional means each includes a fixed axial member having an enlarged portion with a plurality of recesses therein, each recess including a substantially flat surface;

an annular member, having an outer surface which the record media engages, said member being rotatably mounted on the axial member and having an inner wall located opposite said flat surfaces on the enlarged portion of the axial member; and a plurality of cylindrical rollers, each located in a recess between the flat surface thereof and the inner wall of the annular member, said rollers being of a diameter to limit movement of the annular member with respect to the axial member in one direction of rotation while allowing such movement in the opposite direction of rotation.

6. The device of claim 4 in which the first and second unidirectional means each includes a fixed axial member having a plurality of cutout surfaces thereon;

an annular member rotatably mounted on the axial member and having an inner wall located opposite such surfaces on the axial member; and a plurality of coupling members, each located in a recess defined by one of the cutout surfaces and the cooperating inner surface of the annular member, said coupling members riding freely in said recesses when the annular member is rotated in one direction with respect to the axial member, and being moved into a camming engagement between the cutout surface of the axial member and the inner surface of the annular member when rotation of the annular member is commenced in the opposite direction with respect to the axial member, to prevent rotation of the annular member with respect to the axial member in said opposite direction.

7. The device of claim 6, in which the coupling members are cylindrical rollers.

References Cited by the Examiner

UNITED STATES PATENTS

| | | | |
|---|---|---|---|
| 2,348,456 | 5/1944 | Dickerman | 226—148 |
| 3,105,179 | 9/1963 | Young et al. | |

FRANK J. COHEN, *Primary Examiner.*

LEONARD D. CHRISTIAN, *Examiner.*